United States Patent
Armbruster et al.

(10) Patent No.: US 10,613,502 B2
(45) Date of Patent: Apr. 7, 2020

(54) ASSIGNING A CONTROL AUTHORIZATION TO A COMPUTER

(71) Applicant: SIEMENS AKTIENGESELLSCHAFT, München (DE)

(72) Inventors: Michael Armbruster, München (DE); Christoph Niedermeier, München (DE); Jan Sawallisch, München (DE)

(73) Assignee: Siemens Aktiengesellschaft, München (DE)

( * ) Notice: Subject to any disclaimer, the term of this patent is extended or adjusted under 35 U.S.C. 154(b) by 564 days.

(21) Appl. No.: 15/500,381

(22) PCT Filed: Jul. 24, 2015

(86) PCT No.: PCT/EP2015/067031
§ 371 (c)(1),
(2) Date: Jan. 30, 2017

(87) PCT Pub. No.: WO2016/016135
PCT Pub. Date: Feb. 4, 2016

(65) Prior Publication Data
US 2017/0220018 A1    Aug. 3, 2017

(30) Foreign Application Priority Data
Jul. 30, 2014   (DE) .................. 10 2014 214 974

(51) Int. Cl.
*G06F 11/16* (2006.01)
*G05B 19/042* (2006.01)

(52) U.S. Cl.
CPC ..... *G05B 19/0426* (2013.01); *G05B 19/0428* (2013.01); *G06F 11/1633* (2013.01);
(Continued)

(58) Field of Classification Search
CPC .......................... G06F 11/1633; G06F 11/1654
See application file for complete search history.

(56) References Cited

U.S. PATENT DOCUMENTS 5,870,301 A * 2/1999 Yakushiji ............ G06F 11/0757
700/3
9,389,971 B2 7/2016 Grosch et al.
(Continued)

FOREIGN PATENT DOCUMENTS

| CN | 1046235 A | 10/1990 |
| CN | 1419662 A | 5/2003 |

(Continued)

OTHER PUBLICATIONS

Chinese Office Action for Chinese Application No. 201580040702. 5, dated Aug. 28, 2018.
(Continued)

*Primary Examiner* — Zachary K Huson
(74) *Attorney, Agent, or Firm* — Lempia Summerfield Katz LLC (57) ABSTRACT

The invention relates to a system (1), comprising at least two asynchronous computers (2-*i*), on each of which at least one application (A) is executed, which provides control data (SD) for at least one actuation system (3), wherein the provided control data (SD) are transmitted by a control-authorized computer (2-*i*) that assumes a master computer status (M-RS) to the actuation system (3) for the control thereof, wherein the computers (2-*i*) of the system (1) cyclically exchange state data (ZD) and performance data (LD) with each other by means of a data interface in a data exchange (DAS), wherein the computers (2-*i*) each determine, on the basis of the state and performance data ($ZD_{opp}$, $LD_{opp}$) received from other computers (2-*j*) and on the basis of the computer's own state and performance data ($ZD_{own}$, $LD_{own}$, in a master/slave selection (MSA) performed on the
(Continued)

computer (2-$i$), a computer status (RS) as a control-authorized or non-control-authorized computer (2-$i$) to be assumed by the particular computer (2-$i$) itself.

15 Claims, 2 Drawing Sheets

(52) U.S. Cl.
CPC ...... *G06F 11/1654* (2013.01); *G06F 11/1687* (2013.01); *G05B 2219/2231* (2013.01); *G05B 2219/2237* (2013.01); *G05B 2219/24189* (2013.01)

(56) References Cited

U.S. PATENT DOCUMENTS

| | | | |
|---|---|---|---|
| 2002/0134275 A1* | 9/2002 | Stiles | B61B 13/04 104/27 |
| 2005/0097165 A1 | 5/2005 | Lahtinen et al. | |
| 2006/0129735 A1 | 6/2006 | Mizutani | |
| 2006/0150004 A1 | 7/2006 | Mizutani | |
| 2007/0270984 A1 | 11/2007 | Lobig | |
| 2010/0005336 A1 | 1/2010 | Jordan et al. | |
| 2013/0290776 A1 | 10/2013 | Grosch et al. | |

FOREIGN PATENT DOCUMENTS

| | | | |
|---|---|---|---|
| CN | 1790283 | A | 6/2006 |
| CN | 1804811 | A | 7/2006 |
| CN | 101040264 | A | 9/2007 |
| CN | 101794142 | A | 8/2010 |
| CN | 103377083 | A | 10/2013 |
| CN | 103455005 | A | 12/2013 |
| EP | 1860564 | A1 | 11/2007 |
| EP | 2657797 | A1 | 10/2013 |
| WO | WO0184252 | A1 | 11/2001 |

OTHER PUBLICATIONS

PCT International Search Report and Written Opinion of the International Searching Authority dated Oct. 20, 2015 for corresponding PCT/EP2015/067031, with English Translation.
Chinese Office Action for Chinese Application No. 201580040702.5 dated Feb. 25, 2019.

* cited by examiner

ASSIGNING A CONTROL AUTHORIZATION TO A COMPUTER

This application is the National Stage of International Application No. PCT/EP2015/067031, filed Jul. 24, 2015, which claims the benefit of German Patent Application No. DE 10 2014 214 974.6, filed Jul. 30, 2014. The entire contents of these documents are hereby incorporated herein by reference.

BACKGROUND

The present embodiments relate to assigning a control authorization to a computer using a master-slave selection method.

Systems may include a multiplicity of different components. In order to control components, computers that may supply control data are used as control units. These computers may execute one or more applications or application programs that supply control data for controlling system components of the respective system. The components to be controlled include, for example, actuators or actuator components that are actuated as a function of the control data that is obtained. For example, in reliability-critical systems, the actuator system that is to be controlled is to receive continuously and reliably correct control data. Therefore, in such reliability-critical systems, control units or control computers may be provided redundantly. In a vehicle, specific components or actuators of the actuator system are reliability-critical so that there may not be a failure of the control data. Examples of such a reliability-critical actuator unit within a vehicle are vehicle braking devices and/or vehicle steering control devices. If a plurality of computers are responsible for the actuation of such a reliability-critical component or reliability-critical actuator system, which of the redundant computers is control-authorized or which supplies the actuator system with control data is to be detected unambiguously.

SUMMARY AND DESCRIPTION

The scope of the present invention is defined solely by the appended claims and is not affected to any degree by the statements within this summary The present embodiments may obviate one or more of the drawbacks or limitations in the related art. For example, a method and a system for the unambiguous assignment of a control authorization to one of a plurality of computers with which conflicts between the computers in terms of the actuation of a component are reliably avoided are provided.

According to a first aspect, a system having at least two asynchronous computers, on each of which at least one application is executed that provides control data for at least one actuator system, is provided. The provided control data is transmitted from a computer that is control-authorized for this purpose, which assumes a master computer status, to the actuator system for the control thereof. The computers of the system exchange state data and performance data cyclically with one another via a data interface in a data exchange. The computers each determine, based on the state data and performance data obtained from other computers in the data exchange and based on own state data and performance data, a computer status to be assumed by the respective computer itself as a control-authorized or non-control-authorized computer, in a master-slave selection executed on the computer.

In one embodiment of the system, the exchanged state data of a computer has status data of the computer that specifies a computer state of the computer.

The computer state of a computer may have, in one embodiment, a master computer status as a control-authorized computer, a slave computer status as a non-control-authorized computer, and a master intermediate computer status as a computer that is still control-authorized.

In a further embodiment of the system, each computer of the system is assigned an associated time window in which the computer assumes a master intermediate computer status in order to avoid a master-master conflict. The assigned time windows are different for the various computers of the system.

In a further embodiment of the system, the time windows that are assigned to the computers are each larger than a time period that is caused by the asynchronicity during the cyclical communication of the computers with one another and/or by asynchronicity during a startup of the computers.

In a further embodiment of the system, a time difference between the two time windows that are assigned to two different computers is greater than a time period that is necessary for a data transfer reply to the respective other computer.

In a further embodiment of the system, a computer does not assume the computer status determined for the computer until after expiry of a confirmation time period.

In a further embodiment of the system, each computer of the system determines in each case an expected computer status for other computers based on the state data and performance data obtained during the data exchange with the other computers and based on own state data and performance data of each of the computers.

In a further embodiment of the system, the computers of the system determine, in each case based on the state data and performance data and based on the expected computer status determined for the respective computer by the other computers, a computer status that is to be assumed by the computer itself, during the master-slave selection that is executed on the computer.

In a further embodiment of the system, the computer status that is to be assumed by a computer is additionally determined as a function of at least one computer interrupt, occurring at the computer.

This computer interrupt may be a power interrupt.

In a further embodiment of the system, the system is a redundant reliability-critical system (e.g., a distributed system) that transmits control data in a failsafe fashion to at least one actuator system.

In a further embodiment of the system, the computer that assumes, after expiry of the confirmation time period thereof, the master-computer status that is determined for the computer, transmits control data to the actuator system, and maintains its assumed master-computer status until the master-slave selection executed on the computer determines a different computer status for this computer.

In a further embodiment of the system, a computer that has assumed a slave computer status does not change from this assumed slave computer status into the master computer status until the other computer that has hitherto assumed the master control status assumes a different computer status, and the master-slave selection executed on the respective computer determines a master computer status for the respective computer.

In a further embodiment of the system, the state data of a computer specify a state of the computer.

In a further embodiment of the system, the performance data specify a performance of the at least one application executed on the computer in order to generate the control data.

One or more of the present embodiments also provide, according to a further aspect, a method for assigning a control authorization.

The present embodiments accordingly provide a method for assigning a control authorization to one of a plurality of asynchronous computers of a system. The control authorization authorizes the computer to control an actuator system. The method includes determining for each computer a computer status that is to be assumed by the respective computer, by a master-slave selection executed on the respective computer, based on the state data and performance data obtained from the other computers during a data exchange and based on the own state data and performance data of the respective computer. The control authorization for controlling the actuator system is assigned to the computer for which a master-computer status is determined in master-slave selection of the computer.

DETAILED DESCRIPTION

Figure 1:
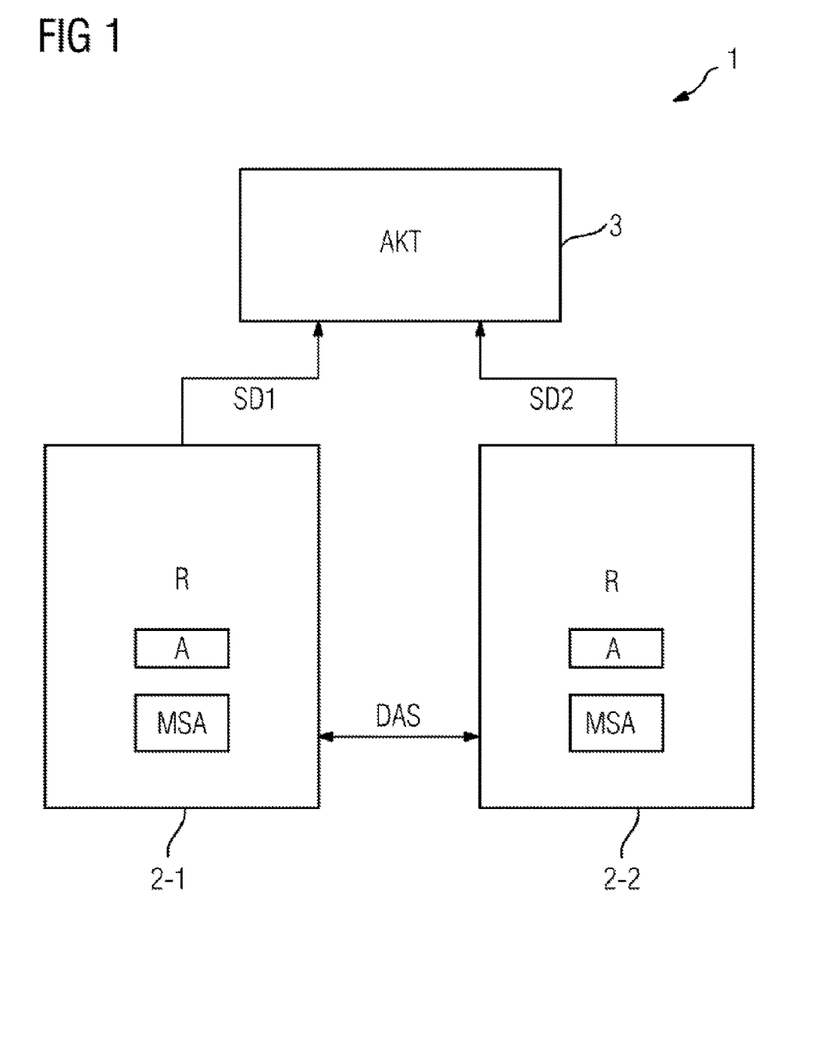
FIG. 1 shows a simple block circuit diagram illustrating an exemplary embodiment of a system.

As is apparent in FIG. 1, a system 1 according to one or more of the present embodiments includes, in the illustrated exemplary embodiment, at least two computers R on each of which at least one application A may be executed. The application A provides control data SD for at least one actuator system AKT of the system 1. In the exemplary embodiment illustrated in FIG. 1, the system 1 has two asynchronous computers 2-1, 2-2 that communicate with one another or exchange data with one another. The two computers 2-1, 2-2 exchange state data ZD and performance data LD cyclically with one another via a data interface in a data exchange DAS. In one example, the data exchange takes place periodically (e.g., with a predefined constant time interval). Based on the state data $ZD_{Opp}$ and performance data $LD_{Opp}$ obtained from at least one other computer in the data exchange DAS and based on own state data $ZD_{Own}$ and performance data $LD_{Own}$ of the respective computer 2-I, a computer status that is to be assumed by the respective computer 2-i itself is determined as a control-authorized computer or as a non-control-authorized computer, in a master-slave selection MSA executed on the computer R. In the case of the redundant system 1 illustrated in FIG. 1, both computers 2-1, 2-2 generate control data, but only the control-authorized computer transmits the control data to the actuator system 3 for the control thereof. The actuator system may include a system component (e.g., a reliability-critical system component such as the vehicle braking unit of a vehicle). The control data may be transmitted, for example, via a control databus from the control-authorized computer to the actuator system 3 for the control thereof.

The exchanged state data ZD of a computer may have status data of the computer that specifies a computer status RS of the respective computer 2-i. The computer status of a computer may have, for example, a master computer status (M-RS) as a control-authorized computer, a slave computer status (S-RS) as a non-control-authorized computer, and a master intermediate computer status (MI-RS) as a provisionally control-authorized computer. In the system 1 according to one or more of the present embodiments, a neatly defined and therefore reliable assignment of a control authorization SB to a computer 2-i for controlling an actuator system 3 is provided. The assignment of the responsibility or control authorization is made in a uniquely defined way or without conflict between various redundantly provided computers 2-i of the system 1. A master-slave selection MSA is carried out between the various computers 2-i. This master-slave mechanism is suitable for providing system consistency in the asynchronous system with redundantly executed applications or else partition clusters PC. In the case of the asynchronous system 1 illustrated in FIG. 1, the computers 2-i or applications A of the computers 2-i operate asynchronously. If appropriate, a plurality of computers may be control-authorized or non-control-authorized (e.g., for a very brief time window during the changing of the computer status).

In one possible embodiment of the system according to one or more of the present embodiments, each of the redundantly provided computers of the system 1 is assigned an associated time window ZF in which the respective computer 2-i assumes a master intermediate computer status MI-RS in order to avoid a master-master conflict. The time windows ZFi that are assigned to the various computers 2-i may be different for the various computers 2-i of the system 1. In the case of components with the same cycle time, information or information data may be exchanged in the same cycle i or with a time offset in one cycle. A further asynchronicity arises from a time discrepancy between the enabling of two energy supply units for the two computers 2-1, 2-2. This asynchronicity arises from a mechanically induced chronological shift or a delay in electrically actuated semiconductor switching elements in a switch for enabling the power supply for the respective computer 2-i, and from the dynamics of the corresponding on-board power system as far as the power supply plugs of the two asynchronous computers 2-1, 2-2.

Owing to the asynchronicities that are present, a time period Δt arises in which the two computers 2-1, 2-2 start corresponding master-slave selections MSA (e.g., the assignment of a control authorization for the respective computer). The time windows ZF that are assigned to the computers may each be longer than a time period ZS that is caused by an asynchronicity during the cyclical communication of the computers 2-i with one another and/or by asynchronicity at a startup of the computers 2-i. For the two computers 2-1, 2-2 (illustrated in FIG. 1) of the redundant system 1, the assigned time windows ZF are set differently or selected with different lengths.

The following is obtained:

Δt>time period (asynchronicity of the cyclical communication)+time period (typical asynchronicity at startup)

In addition, a time difference between the two time windows ZF, which are assigned to the two different computers 2-1, 2-2, may be selected to be longer than a time period ZS that is necessary for a data transfer reply to the respective other computer.

$$ABS(\Delta t\ (R_{Own}) - \Delta t(R_{Opp})) > \text{time period (data transfer reply to } R_{Opp})$$

The two computers 2-1, 2-2 set immediately to a slave computer status (e.g., in the case of a master-master conflict).

In order to assign the responsibility for the control of the actuator system 3 during operation, in each case, a master-slave algorithm or a master-slave selection MSA runs on the two computers 2-1, 2-2. In this context, state data ZD relating to states of components in the system 1 and performance data LD of the components are processed. The state data ZD and performance data LD may be determined in upstream basic processors BP and used for the corresponding selection. After master-slave selection has taken place, as a result, it may be established that a master flag or a slave flag is passed on locally to each of the various computers 2-1, 2-2 and from there to an application A running there or to each of the applications A running there.

A flag may specify whether the respective computer 2-$i$ is the control-authorized computer or a non-control-authorized computer with respect to the actuator system 3. The actuator system 3 of the system 1 then either receives data or control data SD1 from the computer 2-1 or control data SD2 from the computer 2-2, depending on which of the two computers 2-1, 2-2 has the master flag, and therefore which has become the current master computer with respect to the control of the actuator system 3.

The actuator system 3 of the system 1 may generally no longer check whether the incoming control data SD comes from an authorization entity. The actuator system 3 takes into account the control data SD that arrives there (e.g., will execute, as a function of the obtained control data, the function allocated to it within the system 1). This provides the particular advantage that the actuator system 3 of the system 1 may be particularly easily implemented or realized when the method according to one or more of the present embodiments is used. This provides that the technical expenditure for operating the actuator system 3 within the system 1 is significantly reduced when the system 1 according to one or more of the present embodiments or the method according to one or more of the present embodiments is used.

If not only control data SD is transmitted to the actuator system 3 from a single control-authorized computer, filtering of the received control data SD may take place in the actuator system 3. If no control data SD has yet been received by a control-authorized computer, the control data SD of the first control-authorized computer is accepted as control data. If, under certain circumstances, two computers appear simultaneously as control-authorized computers with data received from the actuator system 3 at the same time, one of these two computers is prioritized. The prioritization may be carried out, for example, based on a previously defined rule. If a control-authorized computer has already been detected in the actuator system 3 and a further control-authorized computer is added during operation, for example, only the control data of the original control-authorized computer may be accepted. The control data SD of the newly added control-authorized computer may be rejected in this case.

The system illustrated in FIG. 1 is an asynchronous redundant system with at least two computers 2-$i$ that operate independently of one another. At a time ti, each computer has a certain view of surroundings or of components of the system 1. This view occurs at a time ti±asynchronicity time at another computer of the system 1. In the case of the system 1 according to one or more of the present embodiments, which uses the control authorization selection method, there is therefore no need for complex synchronization of the computers 2-$i$ with one another. The computer status RS that is determined for each computer is not assumed by the computer until after expiry of a confirmation time period.

Each computer 2-$i$ of the system 1 determines, based on the state data $ZD_{Opp}$ and performance data $LD_{Opp}$ obtained from other computers during the data exchange DA and based on own state data $ZD_{Own}$ and performance data $LD_{Own}$, a computer status RS of the respective computer and an expected computer status E-RS for at least one other computer 2-$i$, in the case of a master-slave mechanism MSA that is executed on the computer. This is also illustrated schematically in FIG. 2. The master-slave selection method that is executed on a computer i determines a computer status RS that is to be assumed by the computer R itself as a control-authorized or as a non-control-authorized computer and additionally an expected computer status E-RS for the respective other computer within the system 1. This occurs based on, for example, the state data $ZD_{Opp}$ and performance data $LD_{Opp}$ obtained in the data exchange DAS with at least one other computer 2-$i$ and based on the own state data $ZD_{Own}$ and performance data $LD_{Own}$ of the respective computer 2-$i$. In one embodiment, the computer status that is to be assumed by a computer is additionally determined as a function of at least one computer interrupt RI that occurs at the computer, as illustrated schematically in FIG. 2. This computer interrupt is, for example, a power interrupt for the respective computer 2-$i$.

Figure 2:
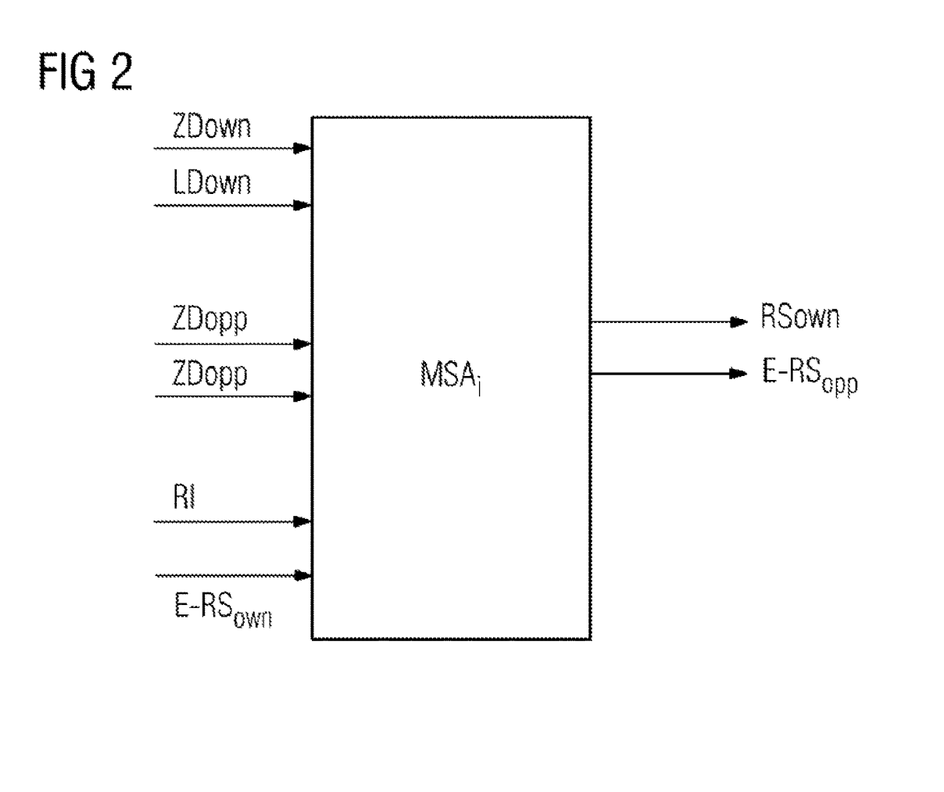
FIG. 2 shows a schematic illustration explaining the method of function of the method according to an embodiment and of the system according to an embodiment for assigning a control authorization.
Figure 3:
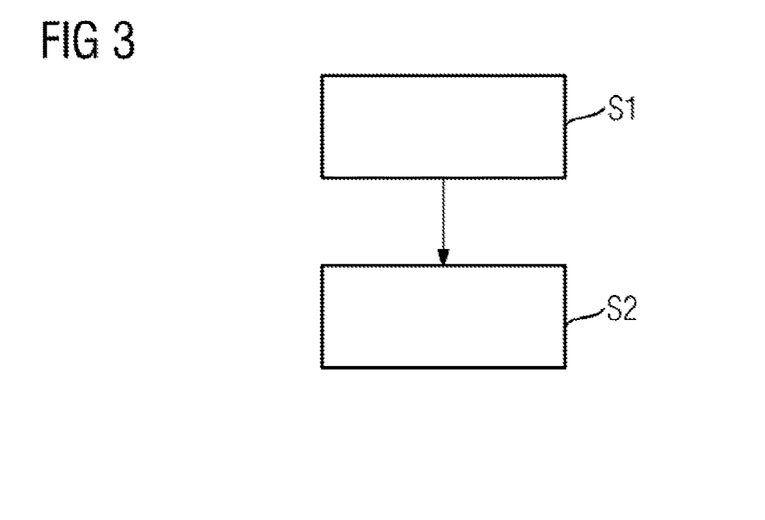
FIG. 3 shows a simple flowchart illustrating an exemplary embodiment for a method according to an embodiment for assigning a control authorization to a computer.

The computer 2-$i$ of the system 1 may determine, in each case based on state data and performance data and based on the expected computer status E-RS determined for the respective computer 2-$i$ by the other computers of the system, a computer status that is to be assumed by the computer 2-$i$, during the master-slave selection MSA, as is also indicated schematically in FIG. 2.

The master-slave selection method illustrated in FIG. 2 is carried out on all the asynchronous redundantly provided computers 2-$i$ of the reliability-critical system 1, as is illustrated by way of example in FIG. 1. The system 1 may be a redundant, reliability-critical system (e.g., a distributed system), in which failsafe control data SD is transmitted to at least one actuator system 3 of the system 1. The control data SD is transmitted from that computer 2-$i$ of the system 1 that is authorized to do so.

A computer 2-$i$ that, after expiry of the confirmation time period thereof, assumes the master computer status M-RS determined for the computer 2-$i$, transmits control data SD to the actuator system 3 and maintains the assumed master computer status until the master-slave selection MSA-$i$ executed on the computer 2-$i$ determines a different computer status RS for the computer 2-$i$.

A computer 2-$i$ that has assumed a slave computer status S-RS does not change over from this assumed slave computer status into the master computer status until the other computer that has previously assumed the master computer status M-RS assumes a different computer status and the master-slave selection $MSA_j$, which was executed on the respective computer, has determined a master computer status M-RS for the respective computer 2-$i$.

In the method according to one or more of the present embodiments for assigning a control authorization or transmission authorization or a responsibility in a redundant system 1 (e.g., a redundant system 1 that is composed of a plurality of components), the actuator system 3 is controlled by precisely one computer 2-*i*, authorized to do so, of the system 1. In this context, state data ZD and performance data LD of components of the system 1 are taken up and used. Based on the evaluated data, precisely one component or control component (e.g., precisely one computer 2-*i* of the system 1) has the authorization or responsibility for the control of the actuator system 3 assigned as a master. This master is, as master, solely responsible for the control of the actuator system 3, and remains so, until the master-slave selection degrades the master to a slave. A slave remains a slave and is not responsible for the control of the actuator system 3, and remains so until promotion to a master. A slave does not become a master until a master is degraded to a slave and the slave declares as ready to control the actuator system 3.

The state data ZD that is exchanged between the computers 2-*i* includes status data of the computers. The computer may assume one of three different computer statuses RS: a master computer status M-RS; a slave computer status S-RS; and a master intermediate computer status MI-RS. The status of master intermediate MI-RS is assumed, for example, at a startup of the computer. The status of master intermediate or master intermediate computer status MI-RS indicates that the respective computer currently does not see any other computer that assumes a master computer status M-RS. The master intermediate computer status MI-RS may be assumed simultaneously by multiple computers 2-*i* of the system 1 for one or more cycles. These computers, which assume a master intermediate computer status MI-RS, act on the actuator system 3 as a master during this time period.

The state data ZD that is exchanged between the computers 2-*i* of the system 1 includes the computer status RS of the respective computers. The state data therefore includes the master-slave information (e.g., master, slave, intermediate) and, in one embodiment, may contain further data (e.g., timeout-shortening instructions and other state data). In addition to the state data ZD, performance data LD is also exchanged between the computers 2-*i*. This performance data LD specifies a performance level or efficiency level. This performance level is implemented, for example, as a scale (e.g., in a value range from 0 to 9). This performance level may describe the execution quality of, for example, an application A or of a partition cluster that includes a plurality of applications that form an observed unit BE. A computer 2-*i* may be promoted to a master computer or receives master computer status M-RS, for example, as soon as the computer may provide a better or higher performance level with respect to the particular observed unit (e.g., application or partition cluster). With the method according to one or more of the present embodiments, not only the performance level or the performance data LD but also the state of the computers or the state data ZD is taken into account. With the method according to one or more of the present embodiments, computers are therefore implicitly prioritized during various operating phases of the system 1 (e.g., during a startup of the system 1).

For each state of a computer 2-*i* of the system, the computer 2-*i* is not only checked whether its own priority or its own performance level is the same, smaller or larger compared to another or an opposite computer, but it may also be checked what expectation the opposite computer 2-*i* of the system 1 has with respect to its own priority, and what expectation computer status E-RS the other computer 2-*i* has determined for its respective own computer. In other words, in an embodiment of the method, it is additionally taken into account whether the opposite computer has determined, as an expected computer status, whether the respective computer is to assume a master computer status or not.

The following table TAB shows a possible implementation of the method according to one or more of the present embodiments and of the system 1 according to one or more of the present embodiments.

| | R(Own) | | | | Cycle i R(Own) | | |
|---|---|---|---|---|---|---|---|
| ID | Role | PL | E-RS | RI | beMsStatusOwn | beMsStatusIntermediate | pcMsStatusOpp |
| 1 | Slave | == | 0 | 0 | 0 | 0 | X |
| 2 | | | | | 0 | 0 | X |
| 3 | | | | | 0 | 0 | X |
| 4 | | | | 1 | 0 | 0 | X |
| 5 | | | 1 | | 0 | 0 | X |
| 6 | Master intermediate | == | 0 | | 0 | 1 | X |
| 7 | | | | | 0 | 1 | X |
| 8 | | | | | 0 | 1 | X |
| 9 | | | 1 | | 0 | 1 | X |
| 10 | Master | == | 0 | | 1 | 0 | X |
| 11 | | | | | 1 | 0 | X |
| 12 | | | | | 1 | 0 | X |
| 13 | | | 1 | | 1 | 0 | X |
| 14 | Slave | < | 0 | | 0 | 0 | X |
| 15 | | | | | 0 | 0 | X |
| 16 | | | | | 0 | 0 | X |
| 17 | | | | 1 | This scenario does not occur since one Ri evaluates the other Rj as worthy to assume the master role only if Prio(Ri) > Prio(Rj). | | |
| 18 | Master intermediate | < | 0 | | 0 | 1 | X |
| 19 | | | | | 0 | 1 | X |
| 20 | | | | | 0 | 1 | X |
| 21 | | | | 1 | This scenario does not occur since one Ri evaluates the other Rj as worthy to assume the master role only if Prio(Ri) > Prio(Rj). | | |
| 22 | Master | < | 0 | | 1 | 0 | X |
| 23 | | | | | 1 | 0 | X |
| 24 | | | | | 1 | 0 | X |

-continued

| ID | | | | | | |
|---|---|---|---|---|---|---|
| 25 | | | 1 | This scenario does not occur since one Ri evaluates the other Rj as worthy to assume the master role only if Prio(Ri) > Prio(Rj). | | |
| 26 | Slave | > | 0 | 0 | 0 | X |
| 27 | | | | 0 | 0 | X |
| 28 | | | | 0 | 0 | X |
| 29 | | | 1 | 0 | 0 | X |
| 30 | Master intermediate | > | 0 | 0 | 1 | X |
| 31 | | | | 0 | 1 | X |
| 32 | | | | 0 | 1 | X |
| 33 | | | 1 | 0 | 1 | X |
| 34 | Master | > | 0 | 1 | 0 | X |
| 35 | | | | 1 | 0 | X |
| 36 | | | | 1 | 0 | X |
| 37 | | | 1 | 1 | 0 | X |

| | Cycle i R(Opp) | | Cycle i + 1 R(Own) | | | | |
|---|---|---|---|---|---|---|---|
| ID | beMsStatusOwn | beMsStatusIntermediate | beMsStatusOwn | beMsStatusIntermediate | indicationMsTakeover_Fco | pcMsStatusOpp | Strategy |
| 1 | 0 | 0 | 0 | 1 | 1 | 0 | Changeover to master after expiry of R-specific timer "indicationMs Takeover_Fco" |
| 2 | 1 | 0 | 0 | 0 | 0 | 0 | |
| 3 | 0 | 1 | 0 | 0 | 0 | 0 | |
| 4 | 0 | 0 | 1 | 0 | 0 | 0 | Interrupt indication is set after the system has had at least one master (Own or Opp). As a result, a fast master takeover is made possible if the following applies: >R(Opp) was master >R(Opp) drops out >R(Own) already has the lowest priority |
| 5 | 0 | 0 | 1 | 0 | 0 | 0 | If R(Opp) has set pcMsStatusOpp, the switching over to the master takes place without a timeout. |
| 6 | 0 | 0 | 0 | 1 | 1 | 0 | Changeover to master after expiry of R-specific timer "indicationMs Takeover_Fco" |
| 7 | 1 | 0 | 0 | 0 | 0 | 0 | |
| 8 | 0 | 1 | 0 | 1 | 1 | 0 | The computer R with the lower ID withdraws. |
| 9 | 0 | 0 | 1 | 0 | 0 | 0 | |
| 10 | 0 | 0 | 1 | 0 | 0 | 0 | |
| 11 | 1 | 0 | 0 | 0 | 0 | 0 | Withdrawal According to 7 the master intermediate withdraws. |
| 12 | 0 | 1 | 1 | 0 | 0 | 0 | |
| 13 | 0 | 0 | 1 | 0 | 0 | 0 | |
| 14 | 0 | 0 | 0 | 0 | 0 | 1 | |
| 15 | 1 | 0 | 0 | 0 | 0 | 1 | |
| 16 | 0 | 1 | 0 | 0 | 0 | 1 | |
| 17 | This scenario does not occur since one Ri evaluates the other Rj as worthy to assume the master role only if Prio(Ri) > Prio(Rj). | | | | | | |
| 18 | 0 | 0 | 0 | 0 | 0 | 1 | |
| 19 | 1 | 0 | 0 | 0 | 0 | 1 | |
| 20 | 0 | 1 | 0 | 0 | 0 | 1 | |
| 21 | This scenario does not occur since one Ri evaluates the other Rj as worthy to assume the master role only if Prio(Ri) > Prio(Rj). | | | | | | |
| 22 | 0 | 0 | 0 | 0 | 0 | 1 | |
| 23 | 1 | 0 | 0 | 0 | 0 | 1 | |
| 24 | 0 | 1 | 0 | 0 | 0 | 1 | |

| ID | | | | | | | Notes |
|---|---|---|---|---|---|---|---|
| 25 | | | | | | | This scenario does not occur since one Ri evaluates the other Rj as worthy to assume the master role only if Prio(Ri) > Prio(Rj). |
| 26 | 0 | 0 | 1 | 0 | 1 | 0 | Switching over to master after R-specific timeout -> relevant in case of failure of master R |
| 27 | 1 | 0 | 0 | 0 | 0 | 0 | |
| 28 | 0 | 1 | 0 | 0 | 0 | 0 | |
| 29 | 0 | 0 | 1 | 0 | 0 | 0 | If R(Opp) has set pcMsStatusOpp, the switching over to the master takes place without a timeout. |
| 30 | 0 | 0 | 0 | 1 | 1 | 0 | Changeover to master after expiry of R-specific timer "indicationMsTakeover_Fco" |
| 31 | 1 | 0 | 0 | 0 | 0 | 1 | |
| 32 | 0 | 1 | 0 | 0 | 0 | 1 | |
| 33 | 0 | 0 | 1 | 0 | 0 | 0 | If R(Opp) has set pcMsStatusOpp, the switching over to the master takes place without a timeout. |
| 34 | 0 | 0 | 1 | 0 | 0 | 0 | |
| 35 | 1 | 0 | 0 | 0 | 0 | 0 | Withdrawal |
| 36 | 0 | 1 | 1 | 0 | 0 | 0 | |
| 37 | 0 | 0 | 1 | 0 | 0 | 0 | If R(Opp) has set pcMsStatusOpp, the switching over to the master takes place without a timeout. |

The implementation specified in the table relates to a system 1 with two computers 2-1, 2-2, as illustrated in FIG. 1. The table may be implemented as a parameterized lookup table. Each computer has a corresponding lookup table. The parameters are formed by, for example, a counter reading for implementing timeouts or delays. During the exemplary implementation presented in the table, 37 possible system states are illustrated for two computers in 37 lines of the lookup table. Each of the two computers 2-1, 2-2 assumes a role as a slave computer, master intermediate computer, or master computer. The output data or flags generated by the master-slave selection method are output during a cycle i and a cycle i+1, as illustrated in the table.

The first column of the table specifies an identifier ID for the various system states.

The second column specifies the role of a first computer 2-i within the system 1.

The third column shows the priority or the performance level of this computer 2-i in comparison with another computer 2-2 of the same system 1. This provides that the own performance level of the first computer 2-1 is either the same, lower than, or higher than the performance level of the opposite other computer 2-2.

In the fourth column, the expected computer status E-RS that is determined by the other computer 2-2 is illustrated (e.g., the expected computer status E-RS that is determined for the first computer 2-1 by the second computer 2-2).

In the fifth column of the table, an interrupt indication is specified (e.g., whether a computer interrupt RI such as a power interrupt is present for the computer).

In the case of the exemplary implementation illustrated in the table, the expected computer status E-RS may assume the value 0 or the value 1. 0 provides that in each case the other computer or the opposite computer 2-2 is of the opinion that its own first computer 2-1 is not master. Conversely, a 1 means that the opposite other computer 2-2 is of the opinion that its own first computer 2-1 is master.

The interrupt indication is set if a master has been selected and a process started. This may be used, for example, as a detection sign for whether a restart or a startup of the computer is occurring. During ongoing operation of a computer within a system 1, for example, power interrupts, during which a computer fails and is then powered up again, may occur.

The column "beMSStatusOwn" given in the table specifies that the respective computer is master. The next column "beMSStatusIntermediate" indicates that the computer has assumed a master intermediate computer status MI-RS. The column "pcMSStatusOpp" indicates that the opposite other computer (Opp computer) is to be the master computer. The one x symbol given in the table indicates that a statement at the respective point is irrelevant.

The columns relating to the cycle i show the storage update with respect to the cycle i. The columns with respect to the cycle i+1 indicate the storage update with respect to the cycle i+1 (e.g., for the next cycle of the system 1).

For the calculation of the output data or flags for the next cycle i+1, each computer 2-i does not consider the opposite other computer for the master slave selection MSA but rather considers itself. The opposite other computer also carries out a master-slave selection method MSA independently thereof, and decides for itself what status the opposite other computer assumes.

If a computer does not receive any data from other computers, the master-slave selection method operates with a default or default values.

Starting at line 1 of the table, the following occurs. If the respective computer is a slave computer (e.g., assumes a slave computer status S-RS and has the same priority or the same performance level as the opposite other computer) and if the other computer does not expect that the respective computer is to be master computer and also if no computer interrupt RI occurs, the respective computer is set, as illustrated on line 1 of the table, to the master intermediate computer status MI-RS. The computer sets an indication for an assumption of action. If a computer-specific timer (makeover) that is started by the setting of the indication has expired (e.g., after a predefined number of n cycles), the computer then changes from the master intermediate computer status MI-RS into the master computer status M-RS.

The timer measures a reaction time. This reaction time may be set in a computer-specific fashion and may be different for each computer 2-i.

The lines indicated in the table represent permutations of the possible states and calculations. The individual lines given in the table do not represent any time sequence. Generally, when transition scenarios are carried out, there is a jump from an initial situation with initial states to a final situation with resulting states over several lines of the table. Here, one line is processed per computing cycle.

In order to be able to determine a maximum possible functional quality or performance quality, a performance level or efficiency may be determined cyclically for each observed unit BE (e.g., for each application or each partition cluster PC that is composed of a plurality of applications).

This performance data LD is exchanged cyclically between the various computers of the system 1, and the computers may therefore determine which computer is able to provide the best performance for the observed unit.

The method pursues the following strategy during the cyclical operation.

If the computer is master with respect to the observed unit, the computer remains master until the computer gives up this master role or this master computer status by its own initiative.

If two computers are participating simultaneously in the master slave distribution, the computer that has the slave role switches to the master only when the previous master has given up its role or has been degraded to the slave computer on its own initiative in the master slave selection method. A master computer loses, for example, its master role when the master computer has failed.

The method according to one or more of the present embodiments reduces the complexity of the assignment of responsibility or control authorization considerably.

In one embodiment, the master-slave selection MSA may be made by a corresponding program that is executed on a microprocessor of the computer 2-i. Each computer 2-i executes on its own initiative such a master-slave selection MSA independently of the other computers. The master-slave selection MSA is dependent on the computer status RS of all the computers and on the current state of the computers. The implemented lookup table shows the method of functioning if both computers are operative.

With the method according to one or more of the present embodiments and with the system 1 according to one or more of the present embodiments, time windows ZE at which no computer supplies control data as master are excluded or minimized. As a result, the stability of the system and therefore the reliability are increased.

A further advantage of the system 1 according to one or more of the present embodiments is that switch-over transients are minimized (e.g., if a computer has assumed the master role, the computer remains master for as long as possible). This also increases the stability of the system 1 (e.g., of control algorithms). As a result of this, the reliability within the system 1 is increased. The method and system 1 provide that the actuator system 3 of the system 1 is controlled or operated with maximum or optimum performance. This also increases the operational reliability of the system 1. The data generated by the computers may include control data (e.g., setpoint values). In the system 1 according to one or more of the present embodiments, a master intermediate computer status is used in addition to the master computer status and the slave computer status. The master intermediate computer status serves to adjust the computers to one another and, for example, also avoids or minimizes master-master conflicts. As a result, time windows in which no master computer is available are excluded or minimized. In addition to its own state, each computer takes into account the performance data and state data exchanged with the other computers. In addition, an expected behavior of the other computers with respect to the computer status that is to be assumed by a computer may be taken into account. The occurrence of an interrupt may also be taken into account in the determination of the computer status or of the control authorization.

The method and system 1 according to the present embodiments may be used in a variety of ways (e.g., in reliability-critical systems with distributed computer structures). The method and system 1 of the present embodiments is suitable, for example, for industrial systems or manufacturing systems and for transportation devices (e.g., trains or motor vehicles).

In one embodiment of the method, the computers may assume various internal states (e.g., duplex control computer (DCC)) states. These states include, for example, "I am active", "currently initializing myself", "about to become fully available", "fully available", "just identifying my current role in total system", "maintaining my role as master in total system", "withdrawing as master and becoming slave", etc.

The control-authorized computer is able to control the actuator system 3 of the system 1 and is able to agree with the rest of the computers or the rest of the system 1 on who is to ultimately control the actuator system 3. If a computer has the slave role, the computer continues to calculate the control data SD for the actuator system 3 and writes the control data SD into an internal memory. However, such control data SD is not passed on to the actuator system 3 by a computer that assumes the slave computer status S-RS. As long as a computer has assumed the master role and has master computer status M-RS, the actuator system 3 is not controlled by another computer.

Because of the asynchronicity that is present and desired in the system 1, it is firstly calculated whether a specific computer within the system 1 may assume the master role but because of the asynchronicity the corresponding result still is to be present unmodified for further cycles within the system 1. This corresponds to the need for time for confirmation (e.g., the system waits for a confirmation time period). Such a confirmation time may also be taken into account in all relevant calculations. The switching over of a computer does not take place until after this confirmation time period has expired.

The actuator system 3 or the actuator of the system 1 is actuated by an application A of a computer. A complex system 1 may contain a plurality of actuators. In this case, the control data SD may also be generated jointly by a plurality of different applications or by one partition cluster PC.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A system comprising:
   at least two asynchronous computers, at least one application that provides control data for at least one actuator system being executed on each of the at least two asynchronous computers, respectively, wherein the provided control data is transmitted from a control-authorized computer that assumes a master computer status, to the at least one actuator system for the control thereof,
   wherein the at least two asynchronous computers of the system exchange state data and performance data cyclically with one another via a data interface in a data exchange, wherein the state data of a computer has status data of the computer that satisifies a computer status of the computer, wherein the computer status of a computer has:
      a master computer status as a control-authorized computer;
      a slave computer status as a non-control-authorized computer; and
      a master intermediate computer status as a computer that is still control-authorized, and
   wherein the at least two asynchronous computers each determine, based on the state data and the performance data obtained from other computers in the data exchange and based on state data and performance data of the at least two asynchronous computers, respectively, the computer status to be assumed by the respective computer as a control-authorized or non-control-authorized computer, in a master-slave selection executed on the computer.

2. The system of claim 1, wherein each computer of the at least two asynchronous computers is assigned an associated time window in which the computer assumes the master intermediate computer status in order to avoid a master-master conflict, and
   wherein the assigned time windows are different for the at least two asynchronous computers of the system.

3. The system of claim 2, wherein the time windows that are assigned to the at least two asynchronous computers are each larger than a time period that is caused by the asynchronicity during the cyclical communication of the at least two asynchronous computers with one another, by asynchronicity during a startup of the computers, or by a combination thereof.

4. The system of claim 2, wherein a time difference between two time windows that are assigned to two different computers is greater than a time period that is necessary for a data transfer reply to the respective other computer.

5. The system of claim 1, wherein a computer of the at least two asynchronous computers does not assume the computer status determined for the computer until after expiry of a confirmation time period.

6. The system of claim 1, wherein each computer of the at least two asynchronous computers of the system determines in each case an expected computer status for other computers based on the state data and the performance data obtained during the data exchange with the other computers and based on state data and performance data of each computer of the at least two asynchronous computers.

7. The system of claim 6, wherein each computer of the at least two asynchronous computers of the system determines, in each case based on the state data and the performance data and based on the expected computer status determined for the respective computer by the other computers, a computer status that is to be assumed by the computer, during the master-slave selection that is executed on the computer.

8. The system of claim 1, wherein the computer status that is to be assumed by a computer is additionally determined as a function of at least one computer interrupt occurring at the computer.

9. The system of claim 1, wherein the system is a redundant reliability-critical system that transmits control data in a failsafe fashion to the at least one actuator system.

10. The system of claim 1, wherein a computer of the at least two asynchronous computers that assumes, after expiry of a confirmation time period thereof, the master-computer status that is determined for the computer transmits control data to the actuator system and maintains the assumed master-computer status until the master-slave selection executed on the computer determines a different computer status for this computer.

11. The system of claim 1, wherein a computer of the at least two asynchronous computers that has assumed the slave computer status does not change from this assumed slave computer status into the master computer status until that other computer that has hitherto assumed the master control status assumes a different computer status, and the master-slave selection executed on the respective computer determines the master computer status for the respective computer.

12. The system of claim 1, wherein the state data of a computer specifies a state of the computer, and the performance data specifies a performance of the at least one application executed on the computer in order to generate the control data.

13. A method for assigning a control authorization to one computer of a plurality of asynchronous computers of a system, wherein the control authorization authorizes the computer to control an actuator system, the method comprising:
   determining for each computer of the plurality of asynchronous computers a computer status that is to be assumed by the respective computer, by a master-slave selection executed on the respective computer, based on state data and performance data obtained from the other computers during a data exchange and based on state data and performance data of the respective computer, wherein the state data of a computer has status data of the computer that satisifies a computer status of the computer, wherein the computer status of a computer has:
- a master computer status as a control-authorized computer;
- a slave computer status as a non-control-authorized computer; and
- a master intermediate computer status as a computer that is still control-authorized; and assigning the control authorization for controlling the actuator system to the computer for which the master-computer status is determined in master-slave selection of the computer.

14. The system of claim 8, wherein the at least one computer interrupt comprises a power interrupt.

15. The system of claim 9, wherein the redundant reliability-critical system is a distributed system.

* * * * *